United States Patent [19]

Frye

[11] Patent Number: 4,477,528
[45] Date of Patent: Oct. 16, 1984

[54] SILICONE RESIN COATING COMPOSITION ESPECIALLY SUITED FOR PRIMERLESS ADHESION TO CAST ACRYLICS

[75] Inventor: Robert B. Frye, Menands, N.Y.

[73] Assignee: General Electric Company, Waterford, N.Y.

[21] Appl. No.: 524,091

[22] Filed: Aug. 17, 1983

Related U.S. Application Data

[60] Division of Ser. No. 34,164, Apr. 27, 1979, Pat. No. 4,413,088, which is a continuation-in-part of Ser. No. 964,911, Nov. 30, 1978, Pat. No. 4,277,287.

[51] Int. Cl.$^3$ .......................... B32B 9/04; B05D 3/02
[52] U.S. Cl. .................................. 428/412; 427/162; 427/163; 427/164; 427/385.5; 427/388.2; 428/429; 428/447; 428/450; 428/451
[58] Field of Search ............... 524/714, 731, 847, 858; 427/387, 385.5, 162, 163, 164, 388.2; 428/412, 450, 429, 447, 451

[56] References Cited

U.S. PATENT DOCUMENTS

| | | | |
|---|---|---|---|
| 3,629,165 | 12/1971 | Holdstock | 260/2.5 |
| 3,686,343 | 8/1972 | Bearden, Jr. et al. | 260/674 |
| 3,708,225 | 1/1973 | Misch et al. | 351/160 |
| 3,898,090 | 8/1975 | Clark | 106/38.2 |
| 3,976,497 | 8/1976 | Clark | 106/287 |
| 3,986,997 | 10/1976 | Clark | 260/29.2 |
| 4,027,073 | 5/1977 | Clark | 428/412 |
| 4,177,315 | 12/1979 | Ubersax | 428/336 |
| 4,315,046 | 2/1982 | Frye | 427/322 |

*Primary Examiner*—Thurman K. Page
*Attorney, Agent, or Firm*—Hedman, Gibson, Costigan & Hoare

[57] ABSTRACT

An improved silicone resin abrasion resistant coating composition is provided, the composition comprising a dispersion of colloidal silica in an aqueous-organic solvent solution of the partial condensate of a silanol and a small amount of a polysiloxane polyether copolymer, said organic solvent comprising a mixture of water miscible polar solvents which are aggressive to plastic.

23 Claims, No Drawings

SILICONE RESIN COATING COMPOSITION ESPECIALLY SUITED FOR PRIMERLESS ADHESION TO CAST ACRYLICS

CROSS-REFERENCE TO RELATED APPLICATION

This application is a divisional of copending U.S. application Ser. No. 034,164, filed Apr. 27, 1979, now U.S. Pat. No. 4,413,088, which is a continuation-in-part of copending U.S. application Ser. No. 964,911, filed Nov. 30, 1978, now U.S. Pat. No. 4,277,287.

BACKGROUND OF THE INVENTION

This invention relates to an improved protective coating composition. More particularly, it relates to a silicone resin coating composition, especially adapted for primerless adhesion to cast acrylic substrates, which when applied to these and other plastic substrates forms a protective abrasion-resistant coating thereon.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eyeglasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering than glass, a serious drawback lies in the ease with which these plastics mar and scratch, due to everyday contact with abrasives, such as dust, cleaning equipment and ordinary weathering. Continuous scratching and marring results in impaired visibility and poor aesthetics, and oftentimes requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated. Acrylics, such as polymethylmethacrylates, like Plexiglas, are also commonly and widely used glazing.

Attempts have been made to improve the abrasion resistance of these transparent plastics. For example, scratch resistant coatings formed from mixtures of silica, such as colloidal silica or silica gel, and hyrolyzable silanes in a hydrolysis medium, such as alcohol and water, are known. U.S. Pat. Nos. 3,708,225, 3,986,997 and 3,976,497, for example, describe such compositions.

Copending and commonly assigned U.S. application Ser. No. 964,910, filed Nov. 30, 1978, now abandoned in favor of U.S. continuation application Ser. No. 415,845, filed Sept. 8, 1982, discloses another abrasion-resistant coating composition. This coating composition has been found to be highly desirable as a protective finish for plastic, as well as metal or metallized substrates. A particularly significant area of application for this coating is in the glazing and optical lens industry. Since these areas require a coating of high optical clarity, coatings which show flowmarks, dirtmarks or other marks which may impair visibility, are undesirable.

In copending U.S. application Ser. No. 964,911, filed on Nov. 30, 1978, now U.S. Pat. No. 4,277,287 it is disclosed that the addition of a small amount of polysiloxane polyether copolymer to the coating compositions disclosed therein eliminates the occurrence of undesirable flowmarks and the like, as well as providing other improvements in the hard abrasion resistant coating.

In many instances, however, in order to obtain good adhesion of the protective silicone resin coating composition to the substrate, a primer must first be applied to the substrate. This has been found to be especially necessary with cast acrylics, e.g., polymethylmethacrylates, like Plexiglas.

It has now been surprisingly discovered that if a solvent comprising a mixture of polar organic solvents miscible with water and alcohol and aggressive to plastic is used in the coating compositions described in U.S. Pat. No. 4,277,287 instead of the dilution solvents, e.g., isobutanol, suggested therein, a protective coating composition is provided which adheres to cast acrylics without the necessity of a primer.

SUMMARY OF THE INVENTION

Accordingly, it is one object of the present invention to provide an improved silicone resin coating composition for solid substrates.

Another object of this invention is to provide a silicone resin coating composition for solid substrates which, when applied, provides an abrasion resistant surface thereto.

Still another object of this invention is to provide a silicone resin protective coating composition for transparent plastics.

A further object of this invention is to provide a silicone resin coating composition which, when applied to a transparent plastic, does not impair the optical clarity thereof.

A still further object of this invention is to provide a silicone resin coating composition which, when applied to a solid substrate, not only provides an abrasion resistant coating thereto but also provides a coating with increased resistance to stress cracking.

Another object of this invention is to provide a protective silicone resin coating composition which can be applied and adhered to cast acrylic substrates without the necessity of a primer coat on the substrate.

These and other objects are accomplished herein by providing an aqueous coating composition comprising (i) a dispersion of colloidal silica in a aqueous-organic solvent solution of the partial condensate of a silanol of the formula $RSi(OH)_3$, wherein R is selected from the group consisting of alkyl having from 1 to 3 carbon atoms and aryl, wherein at least 70 weight percent of the silanol is $CH_3Si(OH)_3$, wherein said organic solvent comprises an aliphatic alcohol and a mixture of water-miscible polar solvents which are aggressive to plastic; and (ii) a polysiloxane polyether copolymer, said composition containing 10 to 40% solids, said solids consisting essentially of 10 to 70 weight % colloidal silica and 30 to 90 weight % of the partial condensate, and wherein said composition has a pH of from 7.1 to about 7.8.

DETAILED DESCRIPTION OF THE INVENTION

The coating compositions of this invention are prepared by hydrolyzing an alkyltrialkoxysilane or aryltrialkoxysilane of the formula RSi(OR)$_3$, wherein R is alkyl of from 1 to 3 carbon atoms or aryl, such as phenyl, in an aqueous dispersion of colloidal silica, diluting the solids content of the resultant hydrolysis mixture with a solvent comprising a mixture of water-miscible polar organic solvents, and admixing a polysiloxane polyether copolymer with the resultant product.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (duPont) and Nalcoag (NALCO Chemical Co.). Such colloidal silicas are available as both acidic and basic hydrosols. For the purposes of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., Na$_2$O) yield a more stable coating composition. Thus, colloidal silicas having an alkali content of less than 0.35% (calculated as Na$_2$O) are preferred. Moreover, colloidal silicas having average particle size of from 10 to 30 millimicrons are also preferred. A particularly preferred one for the purposes herein is known as Ludox LS, sold by DuPont Company.

In accordance with this invention, the aqueous colloidal silica dispersion is added to a solution of a small amount of alkyltriacetoxysilane in alkyltrialkoxysilane or aryltrialkoxysilane. The temperature of the reacting mixture is maintained at about 20° C. to about 40° C. and preferably below 25° C. It has been found that in about six to eight hours sufficient trialkoxysilane or aryltrialkoxysilane has reacted to reduce the initial two-phase liquid mixture to one liquid phase in which the now treated silica (i.e., treated by its admixture with the trialkoxysilane or aryltrialkoxysilane) is dispersed. In general, the hydrolysis reaction is allowed to continue for a total of about 24 hours to 48 hours, depending upon the desired viscosity of the final product. The more time the hydrolysis reaction is permitted to continue, the higher will be the viscosity of the product. Aliphatic alcohol is generated in situ during hydrolysis and as such becomes a part of the total organic solvent medium employed in the compositions of this invention.

After hydrolysis has been completed, and in accordance with the improvement of the present invention, the solids content is adjusted by the addition of a solvent comprising a mixture of polar organic solvents which are miscible with water and aliphatic alcohol and which are also aggressive (will etch) to plastic. Representative of such polar organic solvents include, for example, 2-ethoxyethylacetate (Cellosolve acetate), methyl Cellosolve acetate, butyl Cellosolve acetate, ethyl acetate, propyl acetate, butyl acetate, acetone, 2-butanone, 1,5-pentadione, cyclohexanone, nitropropane and the like. As indicated, mixtures comprising at least two of these solvents have been found to be necessary to give the herein desired results. Generally, the mixture comprises one very aggressive solvent and one less aggressive solvent. Thus, typical solvent mixtures contemplated herein are 2-ethoxyethylacetate and 2-butanone, 2-ethoxyethylacetate and acetone, 2-ethoxyethylacetate and nitropropane, and ethyl acetate and nitropropane, etc. Particularly preferred combinations are 2-ethoxyethylacetate and 2-butanone, 2-ethoxyethylacetate and acetone and 2-ethoxyethylacetate and nitropropane. The total amount of solvent employed in the compositions herein is dependent upon the desired level of solids content. However, for the purposes herein, it has been found that the solvent mixture should contain a ratio of 0.5 to 4 parts of the more aggressive solvent, e.g., the ketone or nitropropane, to 4 parts of the less aggressive solvent, e.g., the ester. For best results, 1 part ketone or nitropropane (more aggressive) to 4 parts ester (less aggressive) is preferred. The solvents can be pre-mixed and added to the hydrolysis product as a mixture or they can each be added to the hydrolysis product separately and mixed therein.

The solids content of the coating compositon of this invention is generally preferred to be in the range of from about 18 to 25%, most preferably about 20%, by weight of the total composition. The pH of the resultant coating composition is in the range of from about 7.1 to about 7.8, preferably higher than 7.2. If necessary, dilute base, such as ammonium hydroxide or weak acid, such as acetic acid, may be added to the composition to adjust the final pH to this desired range.

The polysiloxane polyether copolymers, used as flow control agents herein, may be added to the composition after the hydrolysis is completed. Preferably, however, these copolymers are added to the composition after the initial solids content has been diluted as described above. The polysiloxane polyether copolymer acts as a flow control agent and thereby prevents flowmarks, dirtmarks, and the like, on the surface of the substrate to which the coating is subsequently applied. The polysiloxane polyether copolymer is employed in amounts of from about 2.5 to about 15% by weight of the total solids of the composition. Most advantageous results are achieved when the copolymer is utilized at about 4% by weight of the total solids. At these amounts, the polysiloxane polyether copolymer prevents marks on the substrate which impair visibility or are aesthetically detracting and has no significant deleterious effects on the otherwise good abrasion resistance, scribed adhesion, ultraviolet light resistance, moisture and humidity resistance of the coating. Moreover, the presence of the polysiloxane polyether copolymer additive has been found to reduce the incidence of stress cracking in the hard coating.

Although the polysiloxane polyether copolymer slightly raises the viscosity of the coating composition, it does not accelerate the rate of viscosity increase with age of the composition, nor does it shorten the shelf-life of the composition. The polysiloxane polyether copolymer is completely compatible with the aqueous-organic cosolvent system of the compositions herein and becomes a permanent part of the cured coating, not removed by washing, even with soap and water.

More specifically, some of the polysiloxane polyether copolymers useful in the practice of the invention herein are liquid organopolysiloxane copolymers having the formula:

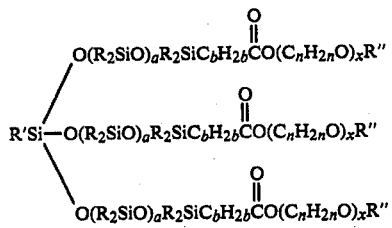

where R and R' are monovalent hydrocarbon radicals; R'' is a lower alkyl radical; a has a value of at least 2, e.g., from about 2 to 40 or more; b has a value of from 2 to 3, n has a value of from 2 to 4 and x has a value of at least 5, e.g., from 5 to 100 or more.

Among the radicals represented by R and R' in the above formula can be mentioned, for example, alkyl radicals, e.g., methyl, ethyl, propyl, butyl, octyl, etc.; cycloalkyl radicals, e.g., cyclohexyl, cycloheptyl, etc.; aryl radicals, e.g., phenyl, tolyl, naphthyl, xylyl, etc.; aralkyl, e.g., benzyl phenylethyl, etc., alkenyl and cycloalkenyl, e.g., vinyl, allyl, cyclohexenyl, etc.; and halogenated radicals of the aforementioned type, e.g., chloromethyl, chlorophenyl, dibromophenyl, etc. R'' is lower alkyl, e.g., an alkyl radical containing from 1 to about 7 carbon atoms, such as methyl, ethyl, propyl, butyl, isobutyl, amyl, etc. The preparation and description of these polysiloxane polyether copolymers is disclosed in U.S. Pat. No. 3,629,165, which is incorporated herein by reference. In the above formula R is preferably methyl, R' is preferably methyl, R'' is preferably butyl, a is preferably 4, b is preferably 3, n is preferably 2.4, and x is preferably 28.5. Particularly suitable polysiloxane polyether copolymers for the purpose of this invention include the materials known as SF-1141 and SF-1141 (General Electric Company), BYK-300, sold by Mallinkrodt, L-540, sold by Union Carbide, and DC-190, sold by Dow Corning.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic, and the like. Alkyltriacetoxysilanes wherein the alkyl group contains from 1-6 carbon atoms can be used, alkyl groups having from 1 to 3 carbon atoms being preferred. Methyltriacetoxysilane is most preferred.

The silanetriols, RSi(OH)$_3$, hereinabove mentioned, are formed in situ as a result of the admixture of the corresponding trialkoxysilanes with the aqueous medium, i.e., the aqueous dispersion of colloidal silica. Exemplary trialkoyxsilanes are those containing methoxy, ethoxy, isopropoxy and n-butoxy substituents which upon hydrolysis generate the silanetriols and further liberate the corresponding alcohol. Thus the aliphatic alcohol content present in the final coating compositions of this invention is provided in this manner. Of course, if a mixture of trialkoxysilanes is employed, a mixture of different silanetroils, as well as different alcohols, is generated. Upon the generation of the silanetriol or mixture of silanetriols in the basic aqueous medium, condensation of the hydroxyl substituents to form

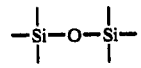

bonding occurs. This condensation takes place over a period of time and is not exhaustive but rather the siloxane retains an appreciable quantity of silicon-bonded hydroxyl groups which render the polymer soluble in the aqueous-organic solvent medium employed herein. This partial condensate can be characterized as a siloxanol polymer having at least one silicone-bonded hydroxyl group per every three

units.

The non-volatile solids portion of the coating composition herein is a mixture of colloidal silica and the partial condensate (or siloxanol) of a silanol. The major portion or all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating, it is preferred to use all methyltrimethoxysilane (thus generating all monomethylsilanetriol) in preparing the coating composition herein. In the preferred coating compositions herein the partial condensate is present in an amount of from about 55 to 75 weight percent of the total solids in the aqueous-organic solvent medium. The alcohol portion (generated in situ) of the total organic solvent medium comprises from about 10% to about 30% by weight.

The coating compositions of this invention will cure on a substrate at temperatures of, for example, 120° C. without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a pH, contain free alkali metal base and alkali metal carboxylic catalysts will be generated in situ during the hydrolysis reaction herein.

The amount of curing catalyst can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75°–150° C. to provide a transparent abrasion resistant surface coating.

The coating compositions of the present invention can be applied to a variety of solid substrates by conventional methods, such as flowing or dipping, to form a continuous surface film. Substrates which are especially contemplated herein are transparent and non-transparent plastics and metals. More particularly, these plastics are synthetic organic polymeric substrates such as acrylic polymers, like poly(methylmethacrylate), polycarbonates (such as those known as Lexan ®), polyesters, such as poly(ethylene terephthalate), poly(butylene terephthalate), etc., polyamides, polyimides, acrylonitrile-stryrene copolymers, styrene-acrylonitrile-butadiene copolymers, polyvinyl chloride, butyrates, polyethylene and the like. While the coating compositions of this invention are intended for use on any of these substrates, as noted above, the present coating compositions are especially useful as coatings for cast acrylics because the compositions herein will adhere to cast acrylic without the necessity of a primer. The metal substrates on which the present protective coatings may be utilized include bright and dull metals like aluminum and bright metallized surfaces like sputtered chromium alloy. Other solid substrates contemplated herein include wood, painted surfaces, leather, glass, ceramics and textiles. By choice of the proper formulations, application conditions and pretreatment of the substrate, including the use of primers, when necessary, the coatings can be adhered to substantially all solid substrates. A hard coating having all of the afore-mentioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane ($RSiO_{3/2}$). In the finished cured coating the ratio of $RSiO_{3/2}$ will range from about 0.43 to about 9.0, preferably 1 to 3. A cured coating having a ratio of $RSiO_{3/2}$ to $SiO_2$, when R is methyl, of 2 is most preferred. The coating thickness can be varied by means of the particular application technique, but coatings of about 0.5 to 20 microns, preferably 2–10 micron thickness are generally utilized.

In order that those skilled in the art may better understand how to practice the present invention, the following examples are given by way of illustration and not by way of limitation.

EXAMPLE 1

22.1 parts by weight of Ludox LS, silica sol (aqueous dispersion of colloidal silica, average particle size of 12 millimicrons, pH of 8.2 sold by DuPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours.

The resultant hydrolyzate is diluted from 40% solids to 23% by the addition of 2-ethoxyethyl acetate. Three separate portions of this mixture are filtered and then further diluted to 21% solids with either 2-butanone or 2-butanone plus 2-ethoxyethyl acetate to give final formulations containing 1%, 5% or 10% of 2-butanone by weight. A polysiloxane polyether copolymer (Union Carbide L-540) flow control agent is added at 4% of total solids to the coating. The product is applied to 6″×8″ unprimed panels of cast acrylic sheet by flow coating, air drying for 30 minutes, and curing in an oven at 93° C. for 2 hours.

The coated panels are clear and colorless, but their initial haze (Hi) was dependent on the concentration of 2-butanone in the formulation.

| 2-butanone in Coating | Initial % Haze (Hi) | Change in % Haze (Δ% H 500) |
|---|---|---|
| 1% | 2.0 | 1.8 |
| 5% | 1.8 | 1.8 |
| 10% | 0.7 | 1.9 |

The panels are abraded for 500 cycles on a Taber Abraser (500 g load, CS-10F wheels) and show excellent abrasion resistance. At 1000 cycles the Δ% Hi was 2.9. The panels are scribed in a cross hatch pattern and subjected to tape pulls using 3 M Scotch 710 tape. Three successive yanks with fresh tape strips cause no delamination; the panels maintain adhesion even after soaking in a 65° C. waterbath for 300 hours.

EXAMPLE 2

To a mixture of 406.8 g of methyltrimethoxysilane and 1.48 g of methyltriacetoxysilane is added 333.6 g of Ludox LS colloidal silica. After stirring for 24 hours at room temperature the hydrolyzate is diluted with 533.2 g of 2-ethoxyethyl acetate (Cellosolve acetate) and treated with 9.9 g of the flow control agent SF-1066 (polysiloxane polyether copolymer). To 100 g of this formulation is added 10 g of acetone. This coating is flow coated onto an unprimed panel of acrylic sheet (Plexiglas S, sold by Rhom & Haas). The coated panel is allowed to air dry, it is then cured at 93° C. for 2 hours. The coated panel gives a Δ% H (change in percent haze) of 1.0 after 500 cycles on the Tabor Abraser. It continues to pass scribed adhesion after more than 2500 hours exposure in the QUV Accelerated Weathering Tester (4 hours UV cycle at 50° C., 4 hours condensation cycle at 45° C.

EXAMPLE 3

To a mixture of 406.8 g of methyltrimethoxysilane and 1.48 g of methyltriacetoxysilane is added 333.6 g of colloidal silica (Ludox LS). After stirring for 24 hours at room temperature, the hydrolyzate is divided into portions and treated as follows: (A) 175 g of hydrolyzate is mixed with 179.5 g of 2-ethoxyethyl acetate and 2.8 g of a polysiloxane polyether copolymer flow control agent; (B) 175 g of hydrolyzate is mixed with 179.5 g of ethyl acetate and 2.8 g of flow agent; (C) 175 g of hydrolyzate is combined with 133.3 g of 2-ethoxyethyl acetate, 2.8 g of flow control agent, and 35.5 g of acetone; and (D) 175 g of hydrolyzate is combined with 133.3 g of ethyl acetate, 2.8 g of flow control agent, and 35.5 g of acetone.

These 4 formulations are coated as in Example 1 on unprimed panels of polymethylmethacrylate (Acrivue, Swedlow, Inc.) and subjected to the scribed adhesion test (tape pull). Coatings A and B fail the adhesion test. Coatings C and D pass the adhesion test and maintain adhesion after soaking for 10 days in a 65° C. waterbath.

EXAMPLE 4

Coatings are prepared identically to C and D in Example 3 except that a mixture of nitropropanes (Nipar) is used in place of acetone. After coating on unprimed acrylic panels as in Example 1, the adhesion test is performed. Both coatings pass scribed adhesion and maintain adhesion after soaking in a 65° C. waterbath for 19 days. The coatings have excellent abrasion resistance ($\Delta\%$ H500=2.8 and 2.3). They maintain both adhesion and appearance for more than 1200 hours of exposure to the QUV Accelerated Weathering Tester.

Obviously, other modifications and variations of the present invention are possible in light of the above teachings. It is therefore to be understood that changes may be made in the particular embodiments described above which are within the full intended scope of the invention as defined in the appended claims.

What is claimed and desired to be secured by Letters Patent is:

1. A solid substrate having at least one surface coated with an aqueous coating composition comprising:
   (i) a dispersion of colloidal silica in an aqueous-organic solvent solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, wherein said organic solvent comprises aliphatic alcohol and a mixture of water miscible polar solvents which are aggressive to plastic in an amount sufficient to etch plastic; and
   (ii) a small amount effective to control flow of a polysiloxane polyether copolymer;
   said composition containing 10 to 40 percent solids, said solids consisting essentially of 10 to 70 weight percent colloidal silica and 30 to 90 weight percent of the partial condensate and wherein said composition has a pH of from 7.1 to about 7.8.

2. A solid substrate having at least one surface coated with the aqueous coating composition of claim 1, wherein said polysiloxane polyether copolymer has the formula:

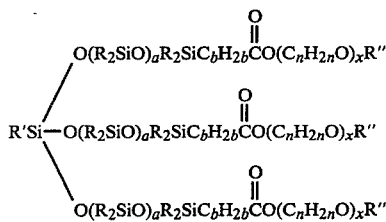

wherein R and R' are monovalent hydrocarbon radicals, R" is a lower alkyl radical, a has a value of at least 2, b has a value of from 2 to 3, inclusive, n has a value of from 2 to 4, inclusive, and x has a value of at least 5.

3. An article as defined in claim 1 wherein the solid substrate is comprised of a synthetic organic polymer.

4. An article as defined in claim 1 wherein said solid substrate is a metal.

5. An article as defined in claim 1 wherein said solid substrate is a synthetic organic polymer having a metallized surface.

6. An article as defined in claim 3 wherein the polymeric substrate is transparent.

7. An article as defined in claim 3 wherein said polymer is a polycarbonate.

8. An article as defined in claim 3 wherein said polymer is an acrylic polymer.

9. An article as defined in claim 7 wherein said polycarbonate is transparent.

10. An article as defined in claim 7 wherein said polycarbonate is a transparent poly(bisphenol-A carbonate).

11. An article as defined in claim 8 wherein said acrylic polymer is cast acrylic polymer.

12. An article as defined in claim 8 wherein said cast acrylic polymer is transparent.

13. An article as defined in claim 12 wherein said transparent cast acrylic polymer substrate is unprimed.

14. An article as defined in claim 1 wherein the aqueous coating composition has been cured on said surface of said solid substrate.

15. An article as defined in claim 2 wherein the aqueous coating composition has been cured on said surface of said solid substrate.

16. An article as defined in claim 13 wherein the aqueous coating composition has been cured on said surface of said solid substrate.

17. A process for forming an abrasion-resistant coating on a substrate comprising applying to said substrate an aqueous coating composition comprising:
   (i) a dispersion of colloidal silica in an aqueous-organic solvent solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, wherein said organic solvent comprises aliphatic alcohol and a mixture of water miscible polar organic solvents which are aggressive to plastic; and
   (ii) a small amount of a polysiloxane polyether copolymer; said composition containing 10 to 40% solids, said solids consisting essentially of 10 to 70 weight % colloidal silica and 30 to 90 weight % of the partial condensate and wherein said composition has a pH of from 7.1 to about 7.8.

18. A process as defined in claim 17 wherein said substrate is cast acrylic.

19. A process as defined in claim 17 wherein said substrate is unprimed cast acrylic.

20. A process as defined in claim 17 wherein said coating is cured on the substrate.

21. A process as defined in claim 18 wherein said coating is cured on the substrate.

22. A process as defined in claim 19 wherein said coating is cured on the substrate.

23. A process as defined in claim 19 wherein said aqueous coating composition contains about 20% solids, the partial condensate is of $CH_3Si(OH)_3$, the aliphatic alcohol is methanol, said polysiloxane polyether copolymer is present in an amount of about 4% by weight of the solids content and said mixture of water miscible polar solvents is selected from the group consisting of 2-ethoxyethylacetate and 2-butanone, 2-ethoxyethylacetate and acetone and 2-ethoxyethylacetate and nitropropane, wherein the solvents are present in the mixture in a ratio of 4 parts by weight of the 2-ethoxyethylacetate to 1 part by weight of the ketone or nitropropane.

* * * * *